No. 733,448. PATENTED JULY 14, 1903.
B. F. WILLIAMS.
POULTRY TROUGH.
APPLICATION FILED JAN. 31, 1903.
NO MODEL.
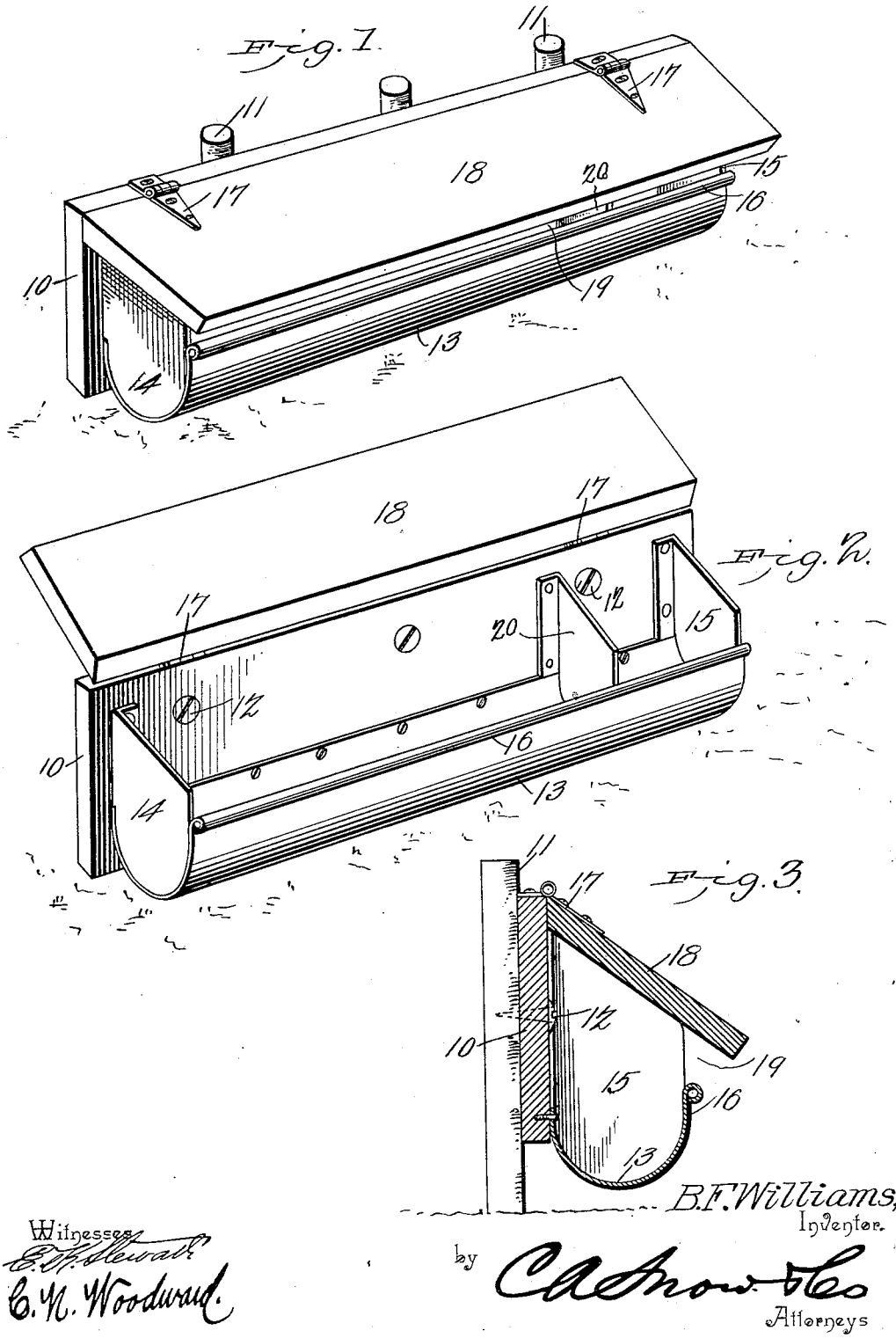

No. 733,448.

Patented July 14, 1903.

UNITED STATES PATENT OFFICE.

BENJAMIN F. WILLIAMS, OF WILKESVILLE, OHIO.

POULTRY-TROUGH.

SPECIFICATION forming part of Letters Patent No. 733,448, dated July 14, 1903.

Application filed January 31, 1903. Serial No. 141,301. (No model.)

*To all whom it may concern:*

Be it known that I, BENJAMIN F. WILLIAMS, a citizen of the United States, residing at Wilkesville, in the county of Vinton and State of Ohio, have invented a new and useful Poultry-Trough, of which the following is a specification.

This invention relates to feed-troughs, more particularly to devices of this class employed for feeding poultry, and has for its object the production of a simply-constructed and easily-operated device which affords ready access at all times to the contents of the trough, while at the same time protecting the feed from the weather and also from waste by the fowl; and the invention consists in certain novel features of construction, as hereinafter shown and described, and specified in the claims following.

In the drawings illustrative of the invention, in which corresponding parts are denoted by like designating characters, Figure 1 is a perspective view of the trough closed. Fig. 2 is a perspective view of the trough open. Fig. 3 is a transverse section.

The improved device consists of a rear wall or plate portion 10, having its upper edge extended and adapted to be secured to a wall or other support or to stakes driven into the ground.

When the device is employed inside the poultry-house or other inclosure, the plate 10 will generally be attached to one of the side walls at any convenient point; but when employed out of doors the plate may be connected to stakes or other similar supports, and for the purpose of illustration it is shown thus supported, the stakes indicated at 11 and the plate secured thereto by screws or bolts 12.

The trough or receptacle is preferably formed with a concave bottom 13, vertical end walls 14 15, and a vertical front wall 16, the end walls extended above the front wall and with the upper edges inclined upwardly and rearwardly toward the plate 10, as shown. An intermediate partition 20 will be disposed in the trough, which thereby divides the trough into two compartments, one for water and one for feed, or for two kinds of feed, as may be required.

Hinged, as at 17, to the rear plate 10 is a cover member 18, extending forwardly and supported upon the inclined end walls, the cover thus being supported in an inclined position with a comparatively contracted longitudinal aperture 19 between the cover member and the front wall of the trough. This aperture will be just wide enough to admit the head of the fowl, but will not admit their bodies. Hence the fowl cannot get into the trough with the feet and spoil or destroy the feed. Another advantage of this construction is that small chicks cannot get into the feed and either destroy the feed or become injured thereby.

When the cover 18 is turned backwardly, as shown in Fig. 2, the whole interior of the trough is exposed and can be thus readily cleansed or a fresh supply of feed deposited. It will thus be noted that access to the trough is possible only through the narrow feed-aperture 19. Hence the feed is not only protected from waste by the fowl, but also protected from the weather and from dust and dirt blown about by the wind. The intermediate partition 20 will preferably be extended in the same manner as the end members 14 15 and will provide intermediate support for the cover, and thus prevent any tendency to sag when the troughs are constructed in long sections.

The rear plate 10 and cover 18 will generally be of wood and the remainder of the device of sheet metal; but the device may be wholly of wood or wholly of metal, as preferred, and I do not, therefore, wish to be limited to any specific material or combination of material from which to construct it.

Having thus described my invention, what I claim is—

1. A feed-trough formed with its rear and end walls extended upwardly above the top of its front wall, and a cover member hinged to said rear wall and supported by said end walls, whereby a longitudinal feed-aperture is provided between the cover and front wall of the trough, substantially as described.

2. A feed-trough formed with its rear end walls extended upwardly above the front wall thereof, the end walls being inclined toward the front wall, and a cover member hinged to said rear wall and supported in an inclined position upon said end walls, whereby the contents of the trough will be protected and a longitudinal feed-aperture formed between the cover member and front wall, substantially as described.

3. A feed-trough consisting of a rear plate or wall, a front wall terminating in a concave bottom end walls connected to said rear-wall plate and extended upwardly above the top of the front wall, and a cover member hinged to said rear-wall plate and supported movably upon said end walls, whereby a round-bottomed receptacle is formed accessible only through a longitudinal aperture between the cover member and the front wall of the trough, substantially as described.

4. A feed-trough formed with its rear and end walls extended upwardly above the top of its front wall and an intermediate transverse division-wall, in combination with a cover member hinged to said rear wall and supported upon said end and intermediate walls, whereby independent longitudinal feed-apertures are provided for each of the compartments formed by the intermediate division member, substantially as described.

In testimony that I claim the foregoing as my own I have hereto affixed my signature in the presence of two witnesses.

BENJAMIN F. WILLIAMS.

Witnesses:
EUGENE M. BISHOP,
GEORGE B. RADEKIN.